(12) United States Patent
Harris et al.

(10) Patent No.: US 6,996,057 B2
(45) Date of Patent: Feb. 7, 2006

(54) INTEGRATED RF LOOPBACK TEST APPARATUS FOR REDUNDANT DATA RADIO TRANSCEIVER SYSTEM

(75) Inventors: Joseph L. Harris, Athens, AL (US); David Paul Nelson, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 902 days.

(21) Appl. No.: 09/971,451

(22) Filed: Oct. 5, 2001

(65) Prior Publication Data

US 2003/0067869 A1   Apr. 10, 2003

Related U.S. Application Data

(63) Continuation of application No. 09/971,522, filed on Oct. 5, 2001, now Pat. No. 6,965,756.

(51) Int. Cl.
*H04L 12/26* (2006.01)

(52) U.S. Cl. .................................... 370/217; 370/249

(58) Field of Classification Search ............... 370/217, 370/219, 220, 221, 242, 248, 249, 343, 250, 370/251, 297, 344; 379/279; 714/716
See application file for complete search history.

(56) References Cited

U.S. PATENT DOCUMENTS

| | | | |
|---|---|---|---|
| 5,442,811 A | | 8/1995 | Kobayashi et al. ......... 455/67.3 |
| 5,481,186 A | | 1/1996 | Heutmaker et al. ...... 324/158.1 |
| 5,754,560 A | * | 5/1998 | Nousiainen et al. ......... 714/716 |
| 5,809,406 A | * | 9/1998 | Taki et al. ................... 455/135 |
| 6,570,844 B1 | * | 5/2003 | Deschaine ................... 370/217 |
| 6,587,686 B1 | * | 7/2003 | Cuffaro et al. .............. 455/423 |
| 6,687,217 B1 | * | 2/2004 | Chow et al. ................ 370/217 |

* cited by examiner

*Primary Examiner*—Man U. Phan
*Assistant Examiner*—Toan Nguyen
(74) *Attorney, Agent, or Firm*—Allen, Dyer, Doppelt, Milbrath & Gilchrist, P.A.

(57) ABSTRACT

A redundant communication system contains a principal transceiver and a back-up transceiver to be controllably substituted for the principal transceiver. A monitor protection switch, which controls swapping the two transceivers, has an RF loopback test circuit that is switchably coupled to whichever transceiver is the back-up. The RF loopback test circuit monitors the operational capability of the back-up transceiver, and provides an indication of its functionality. If the back-up transceiver is defective, corrective action can be taken in advance of a potential operational failure of the principal transceiver. As long as the RF loopback test circuit indicates proper operational capability of the back-up transceiver, the redundant transceiver can be immediately switched in place of the principal transceiver.

11 Claims, 2 Drawing Sheets

INTEGRATED RF LOOPBACK TEST APPARATUS FOR REDUNDANT DATA RADIO TRANSCEIVER SYSTEM

CROSS-REFERENCE TO RELATED APPLICATION

The present application is a continuation-in-part of U.S. patent application, Ser. No. 09/971,522 filed Oct. 5, 2001, now U.S. Pat. No. 6,965,756 entitled: "RF Loopback Test Apparatus for Data Radio Transceiver," by J. Harris et al (hereinafter referred to as the '522 application), assigned to the assignee of the present application and the disclosure of which is incorporated herein.

FIELD OF THE INVENTION

The present invention relates in general to communication systems and components therefor, and is particularly directed to the integration of an RF loopback test circuit, of the type described in the above-identified '522 application, into the monitor protection switch of a redundant digital communication radio system, so as to allow the supervisory control processor of the protection switch to continuously monitor the operational capability of a back-up (redundant) transceiver, which is to be controllably placed in service or 'swapped' with the principal transceiver in the event of a failure of the principal transceiver.

BACKGROUND OF THE INVENTION

As described in the above-referenced '522 application, the ongoing development of wideband signal transport technologies, including coaxial cable, fiber optic and wireless (e.g., radio) systems, have resulted in a multiplicity of communication systems that serve a diversity of environments and users, such as ISM (Industrial, Scientific and Medical) customers. A particular advantage of wireless service is the fact that it is very flexible and not limited to serving only customers having access to existing or readily installable cable plants. Moreover, there are many environments, such as, but not limited to portable data terminal equipments (DTEs), where a digital wireless subsystem may be the only practical means of communication. To provide digital communication service, the wireless (radio) subsystem is interfaced with an existing digital network's infrastructure providing power and legacy wireline links (that may contain one or more repeaters) to an incumbent service provider site.

FIG. 1 diagrammatically illustrates such a radio as having an ISM-band compatible (e.g., spread spectrum) digital transceiver 10. The transceiver 10 includes a transmitter section 11, that is operative to perform spread spectrum modulation and up-conversion of baseband signals supplied from a baseband processor or digital data pump 15 (such as a T1 framer chip) coupled over a digital communication link 16 (e.g., a T1 link) to a telecommunication network 17.

The output of the transmitter section 11 is an FCC-conformal band RF signal (e.g., ISM 2.4–2.4385 GHz, or 5.725–5.850 GHz spread spectrum signal). This signal is applied to a transmit input port 21 of a diplexer 20, which has an antenna interface port 23 coupled to an associated radio antenna 25. A receiver port 22 of the diplexer 20 is coupled to a receiver section 12 of the transceiver, in which the spread RF signal received from the remote site radio is down-converted and demodulated to baseband for application to the digital data pump 15.

The transmit and receive ISM band frequencies interfaced by the diplexer 20 with the antenna 25 are prescribed by one of two complementary frequency plans (e.g., a transmit frequency $f_T$=2.462 GHz and a receive frequency $f_R$=2.422 GHz for use by the local site radio). These frequencies correspond to those of a narrowband transmit path filter 26 installed between transmit port 21 and antenna port 23, and a narrowband receive path filter 27 installed between antenna port 23 and receive port 22. The other (complementary) frequency plan is employed by a companion digital radio at a remote site (e.g., having a transmit frequency $f_T$=2.422 GHz and a receive frequency $f_R$=2.462 Ghz).

To facilitate selection of either frequency plan, the radio transceiver-diplexer arrangement may be configured as disclosed in the U.S. patent to P. Nelson et al, U.S. Pat. No. 6,178,312, issued Jan. 23, 2001, entitled: "Mechanism for Automatically Tuning Transceiver Frequency Synthesizer to Frequency of Transmit/Receiver Filter" (hereinafter referred to as the '312 patent), assigned to the assignee of the present application and the disclosure of which is incorporated herein. In accordance with this patented scheme, the frequency plan (transmit/receive frequency pair) of the radio is defined by selectively coupling the appropriate one of the two diplexer ports to the transmit port of the transceiver and the other diplexer port to the receive port of the transceiver. (At the far end or remote site, the diplexer-to-transceiver port connections are reversed.)

Because the environment in which such a digital radio is expected to be used may not provide ready access to alternative communication services, an auxiliary or redundant transceiver, to be substituted or switched in place of the main or principal radio by an associated controller, in the event of an apparent failure of the principal radio, may be employed. However, the ability to switch in a back-up radio does not resolve whether or not there is indeed an operational problem with the main radio.

For example, in the event of an apparent failure in initiating or conducting communications between the local radio and a remote site, it would be desirable to know if the problem lies with the local equipment, or resides in the remote site. This is particularly true where the radio is located at a relatively inaccessible location, where maintenance services may not be not readily available.

Fortunately, this problem is readily resolved by the reduced complexity and cost 'localized' RF loopback test circuit disclosed in the '522 application, which is configured to be coupled to the antenna port of the radio's diplexer, and is operative to determine whether the radio is functioning properly. No communication with a remote site need be attempted. As shown in FIG. 2, this RF loopback test circuit includes a frequency generator (such as a crystal oscillator) 30 which is operative to generate an auxiliary frequency fA, which corresponds to the sum or difference between the transmit and receive frequencies employed by the radio 10. As a non-limiting example, for respective transmit (fT=2.462 GHz) and receive (fR=2.422 GHz) ISM band frequencies of the transceiver of FIG. 1, auxiliary frequency generator 30 outputs an auxiliary frequency fA= (2.462–2.422) GHz=40 MHz.

The output of the frequency generator 30 is (resistor-coupled) to a Schottky diode mixer 42, which is further coupled through an attenuator network 44 to an input/output port 46. Being coupled to each of frequency generator 30 and the input/output port 46, the Schottky diode mixer 42 is operative to produce respective output frequencies representative of the sum and difference of the (40 MHz) frequency output of generator 30 and the frequency of whatever signal is coupled to input/output port 46. Thus, by coupling the input/output port 46 to the diplexer's antenna port 23, then as long as the radio's transceiver section 11 is transmitting at $f_T$=2.462 GHz, mixer 42 will produce a sum frequency $f_S$ (2.462+0.040=2.502 GHz), and a difference frequency $f_D$ (2.462−0.040=2.422 GHz, which corresponds to the receive frequency $f_R$).

Each of these frequencies is looped back to the narrowband filters 26 and 27 of the diplexer 20. Since only the (difference) frequency $f_D$=2.422 GHz is associated with either filter (the narrowband receive path filter 27), the diplexer's receive port 23 will output the (difference) frequency $f_D$=2.422 GHz for application to the receiver section 12. The summation frequency $f_S$=2.502 GHz, on the other hand, is blocked by both narrowband filters 26 and 27.

As long as the RF loopback test circuit 30 is operating correctly, then if the radio's receiver section 12 providing an indication that it is receiving sufficient signal level, it can be inferred that each of the transmitter and receiver sections of the digital radio is operating properly, and any failure of the radio to receive from a remote site can be attributed to a problem at the remote site, or a local problem with the feedline, connectors, or the antenna itself. On the other hand, if the radio's receiver produces no output, it can be inferred that there is a problem with the local radio.

SUMMARY OF THE INVENTION

In accordance with the invention, the ability of the RF loopback test circuit of the '522 application to determine whether a transceiver is functioning properly is incorporated into the monitor protection switch of a redundant digital telecommunications radio system, so as to enable the protection switch to monitor and thereby have knowledge of the 'health' or operational capability of a back-up transceiver, which is to be controllably placed in service in the event of a failure of a principal transceiver.

Each transceiver may be of the type described above, and is adapted to be coupled by way of a monitor protection switch to each of a digital communication link and a radio antenna. The monitor protection switch's supervisory control processor monitors the functionality of each transceiver, and executes a prescribed performance capability algorithm, such as one monitoring signal level and/or bit error rate, of the type customarily employed in telecommunication systems. The protection switch selectively controls connectivity through a signal transport multiplexer to which the digital link and each of transceiver is coupled, so that a selected (in-service) one of the transceiver pair will be coupled to the digital link, while the other (back-up) transceiver is taken off line.

For this purpose, the monitor protection switch contains an RF loopback test circuit and an associated antenna interface switch coupled with the radio antenna and antenna ports of the two transceivers. A first terminal of the antenna interface switch is coupled to the input/output port of the RF loopback test circuit and a second terminal is coupled to the radio antenna. A third terminal is coupled to the antenna interface port of the diplexer of one transceiver and a fourth terminal is coupled to the antenna interface port of the diplexer of the other transceiver.

A first switchable path of the switch is coupled to the second terminal as a common terminal therefor, and is switchable between the third and fourth terminals. A second switchable path is coupled to the first terminal as a common terminal therefor, and also being switchable between the third and fourth terminals. The positions of the switchable paths are controlled by the supervisory control processor in association with its control of the operation of the signal transport multiplexer.

One of the switchable paths couples the antenna interface port of the in-service transceiver to the antenna, while the other switchable path couples the antenna interface port of the back-up transceiver to the input/output port of the RF loopback test circuit. In association with the operation of these switchable paths, the multiplexer also couples the digital communication link to the in-service transceiver and decouples it from the back-up transceiver. This enables the back-up transceiver to have its operational capability monitored by the RF loopback test circuit.

This use of the RF loopback test circuit to monitor the back-up transceiver enables the redundant radio system to provide an on-going indication of its functionality, so that, if the monitor protection switch detects a failure in the back-up transceiver, operational personnel may be alerted, and corrective action taken in advance of a potential operational failure of the on-line transceiver.

In a complementary fashion, as long as the RF loopback test circuit indicates proper operational capability of the back-up transceiver, the redundant transceiver is ready to be immediately switched in place of the principal transceiver, should the monitor protection switch detect a failure in the principal transceiver. At that point, the formerly back-up transceiver becomes the principal transceiver, and the previously on-line transceiver becomes the back-up transceiver. The RF loopback test circuit, to which the substituted principal transceiver is now coupled, tests that transceiver as described above, to determine whether in fact there is a problem with the local equipment.

DETAILED DESCRIPTION

Before describing in detail the new and improved integrated RF loopback test apparatus of the present invention, it should be observed that the invention resides primarily in a modular arrangement of conventional RF signaling and interface components, and associated connector hardware therefor, that is operative to couple the antenna port of the principal transceiver redundant transceiver pair to an antenna interface port of a monitor protection switch, while also coupling the antenna port of the backup transceiver to an RF loopback test circuit of the type described in the '522 application. As described above, this enables the control processor of the protection switch to continuously monitor the operational capability of the back-up (redundant) transceiver, which is to be controllably placed in service in the event of a failure of a principal transceiver.

In terms of a practical implementation that facilitates manufacture and coupling to such a radio, this modular arrangement may be readily configured as an application specific integrated circuit (ASIC) chip set, and/or commercially available devices and components. As a consequence, its configuration and the manner in which it may be interfaced with an existing digital radio have been shown in a readily understandable schematic and block diagram format, which shows only those specific details that are pertinent to the present invention, so as not to obscure the disclosure with details that are readily apparent to one skilled in the art having the benefit of present description.

Figure 1:
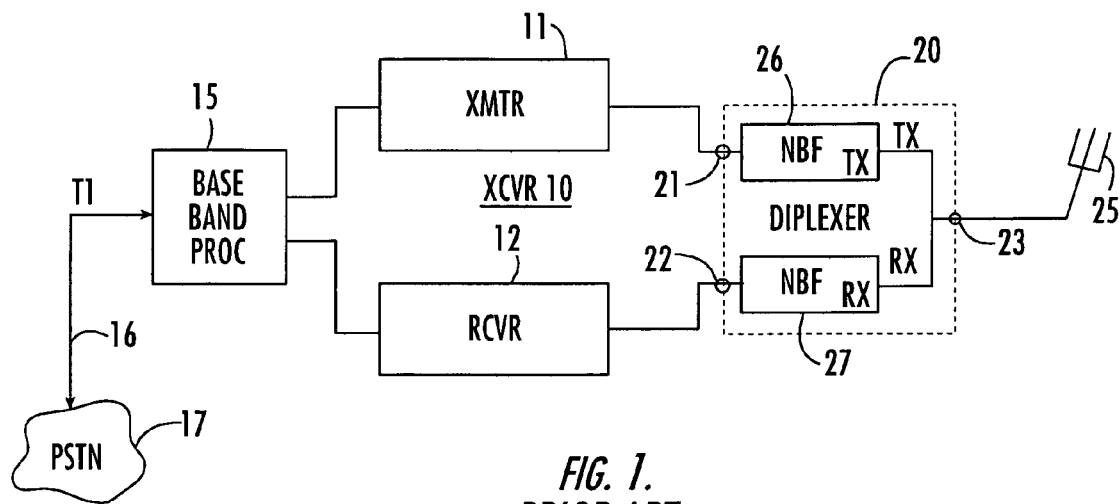
FIG. 1 diagrammatically illustrates the architecture of a digital (T1) radio.
Figure 2:
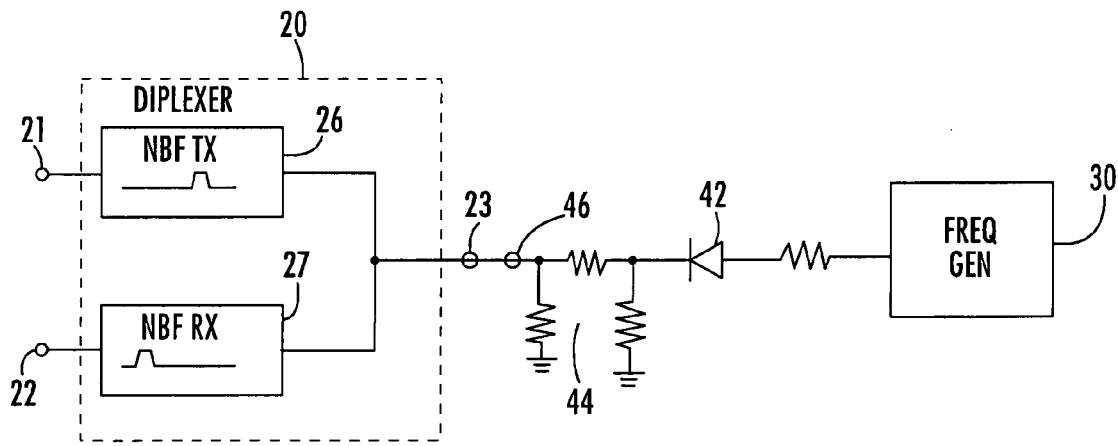
FIG. 2 is a schematic diagram of an embodiment of the RF loopback test arrangement of the invention disclosed in the above-referenced '522 application.
Figure 3:
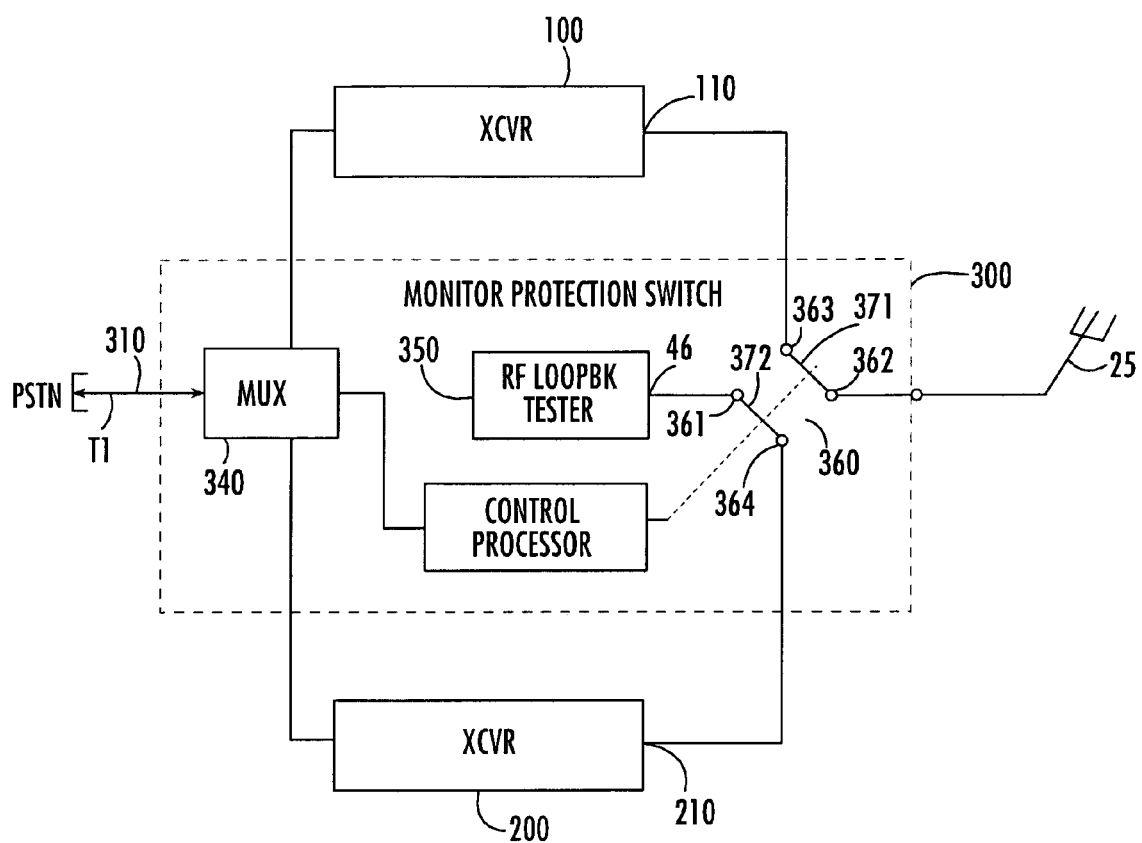
FIG. 3 diagrammatically illustrates the overall architecture of a redundant radio system containing the RF loopback test arrangement disclosed in the above-referenced '522 application.

Reference is now directed to FIG. 3, which diagrammatically illustrates the overall architecture of a redundant radio system, in which the integrated RF loopback test apparatus of the present invention may be incorporated. As shown therein, the redundant radio system includes a pair of transceivers 100 and 200, one of which (e.g., transceiver 100) is placed in operation as a principal (in-service) transceiver, and the other (redundant) of which (e.g., transceiver 200) serves as a secondary or back-up transceiver. Each transceiver may be of the type described shown in FIGS. 1 and 2, and is adapted to be coupled by way of a monitor protection switch 300 to radio antenna 25, and a digital communication link 310, such as but not limited to a T1 link.

As in a conventional redundant telecommunication system of the type described above, the monitor protection switch 300 contains a supervisory control processor 330, that is operative to sense one or more threshold/alarm parameter inputs and thus monitor the functionality of each transceiver. Based upon these inputs, the control processor 330 selectively controls connectivity through a signal transport multiplexer 340, to which the digital link 310 and each of transceivers 100 and 200 is coupled, so that a selected (in-service) one of the transceiver pair will be coupled to link 330, while the other (back-up) transceiver is taken off line. As described above, control processor 330 may execute a prescribed performance capability algorithm, such as one monitoring signal level and/or bit error rate.

In accordance with the invention, the monitor protection switch is augmented to incorporate an RF loopback test circuit 350, of the type described in the '522 application and shown in FIG. 2, as well as an associated antenna interface switch 360, which are coupled in circuit with the radio antenna 25 and antenna interface ports 110 and 210 of the (diplexers for) the respective transceivers 100 and 200. The antenna interface switch 360 has a first terminal 361 coupled to the input/output port 46 of the RE loopback test circuit 350, and a second terminal 362 coupled to the radio antenna 25. The antenna interface switch 360 further includes a third terminal 363 coupled to the antenna interface port 110 of the diplexer of transceiver 100, and a fourth terminal 364 coupled to the antenna interface port 210 of the diplexer of transceiver 200.

The antenna interface switch 360 further includes a first switchable path 371 coupled to the second terminal 362 as a common terminal therefor, and being switchable between the third and fourth terminals 363 and 364. It also includes a second switchable path 372 coupled to the first terminal 361 as a common terminal therefor, and also being switchable between the third and fourth terminals 363 and 364. The positions of the first and second switchable paths 371 and 372 are controlled by the supervisory control processor 330 in association with its control of the operation of the signal transport multiplexer 340.

For the switch path positions of the antenna interface switch shown in FIG. 3, the first switchable path 371 couples the radio antenna 25 to the antenna interface port 110 of the diplexer of transceiver 100, while the second switchable path 372 couples the antenna interface port 210 of the diplexer of transceiver 200 to the input/output port 46 of the RF loopback test circuit 350. For these switch positions, the signal transport multiplexer 340 couples the digital communication link 310 to transceiver 100.

For these states of the switch paths through the monitor protection switch 300, the transceiver 100 serves as the active or in-service transceiver, having its input/output ports coupled in circuit with each of digital communication link 310 and the radio antenna 25. The redundant transceiver 200, on the other hand, has its input/output ports decoupled from each of the digital communication link 310 and the radio antenna 25; it is coupled, instead, via its antenna interface port 210 to the RF loopback test circuit 350. As such, the transceiver 200 serves as an auxiliary, or stand-by transceiver.

As described above, pursuant to the invention, rather than being placed in an idle or de-energized state, the back-up or redundant transceiver (transceiver 200 for the switch path positions of the antenna interface switch shown in FIG. 3) has its operational health monitored in an on-going manner (e.g., effectively continuously, or periodically) by the RF loopback test circuit 350. This use of the RF loopback test circuit to monitor the back-up transceiver enables the redundant radio system to provide an indication of the back-up transceiver's operational capability, so that, if the monitor protection switch 300 detects a failure in the back-up transceiver, that failure may be indicated to operational personnel, and corrective action taken in advance of a potential operational failure of the on-line transceiver.

In a complementary manner, as long as the RF loopback test circuit 350 indicates proper operational capability of the back-up transceiver, the monitor protection switch's control processor 330 knows that it can safely immediately switch the redundant transceiver in place of the principal transceiver, should the monitor protection switch 300 detect a failure in the principal transceiver. At that point, the previously on-line transceiver (transceiver 100 in the present example) becomes the back-up transceiver, and the formerly back-up transceiver (transceiver 200 in the present example) becomes the principal transceiver. The RF loopback test circuit, to which the substituted principal transceiver is coupled, can now test that transceiver as described above, to determine whether in fact there is a problem with the local equipment.

As will be appreciated from the foregoing description, the functionality of the RE loopback test circuit of the '522 application enables the monitor protection switch of a redundant digital telecommunications radio system to continuously monitor the operational capability of its back-up transceiver, and provide an indication of its functionality. Should the monitor protection switch detect a failure in the back-up transceiver, that failure can be immediately indicated to operational personnel, and corrective action taken in advance of a potential operational failure of the on-line transceiver. As long as the RF loopback test circuit indicates proper operational capability of the back-up transceiver, the redundant transceiver can be immediately switched in place of the principal transceiver, should the monitor protection switch detect a failure in the principal transceiver.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A method of controlling the operation of a redundant communication system having first and second transceivers, that are adapted to be coupled between a first communication link and a second communication link, one of said transceivers serving as a principal transceiver, and the other of said transceivers serving as a back-up transceiver that is adapted to be controllably placed in service in lieu of said principal transceiver, said method comprising the steps of:

(a) providing a loopback test circuit that is operative to test the functionality of that one of said first and second transceivers to which it is coupled; and (b) providing a controllable switch that is operative to selectively couple said principal transceiver to said first and second communication links, while also coupling said back-up transceiver to said loopback test circuit; and wherein step (b) comprises monitoring the functionality of said principal transceiver and operating said controllable switch so as to couple said back-up transceiver to said first and second communication links in place of said principal transceiver, in response to detecting a prescribed decrease in said functionality of said principal transceiver.

2. The method according to claim 1, wherein step (b) further comprises operating said controllable switch so as to couple said back-up transceiver to said first and second communication links, while also coupling said principal transceiver to said loopback test circuit.

3. The method according to claim 1, wherein said first communication link comprises a digital communication link, said second communication link comprises an RF communication channel, and said loopback test circuit comprises an RF loopback test circuit.

4. A method of controlling the operation of a redundant communication system having first and second transceivers, that are adapted to be coupled between a first communication link and a second communication link, one of said transceivers serving as a principal transceiver, and the other of said transceivers serving as a back-up transceiver that is adapted to be controllably placed in service in lieu of said principal transceiver, said method comprising the steps of:

(a) providing a loopback test circuit that is operative to test the functionality of that one of said first and second transceivers to which it is coupled; and (b) providing a controllable switch that is operative to selectively couple said principal transceiver to said first and second communication links, while also coupling said back-up transceiver to said loopback test circuit; and wherein said loopback test circuit comprises a frequency generator that is operative to generate an auxiliary frequency signal having a frequency on the order of the sum or difference between a transmit frequency and a receive frequency employed by said principal and back-up transceivers, and a frequency combiner, coupled to said frequency generator and to said controllable switch, and being operative to combine said auxiliary frequency signal with an output frequency produced by that one of said first and second transceivers to which said loopback test circuit is switchably coupled.

5. The method according to claim 4, wherein said frequency combiner includes a Schottky diode mixer and an attenuator network coupled between said frequency generator and said controllable switch.

6. A redundant communication system comprising:

first and second transceivers, that are adapted to be coupled between a digital communication link and a wireless communication channel, one of said transceivers serving as a principal transceiver, and the other of said transceivers serving as a back-up transceiver that is adapted to be controllably placed in service in lieu of said principal transceiver; and a monitor protection switch containing a wireless communication channel loopback test circuit that is operative to test the functionality of that one of said first and second transceivers to which it is coupled, and a controllable switch that is operative to selectively couple said principal transceiver to said digital communication link and said wireless communication channel, while also coupling said back-up transceiver to said wireless communication channel loopback test circuit; and further including a switch controller that is operative to monitor the functionality of said principal transceiver and cause said controllable switch to couple said back-up transceiver to said digital communication link and to said wireless communication channel, in place of said principal transceiver, in response to detecting a prescribed decrease in said functionality of said principal transceiver.

7. The redundant communication system according to claim 6, wherein said controllable switch is further operative to selectively couple said back-up transceiver to said digital communication link and said wireless communication channel, while also coupling said principal transceiver to said wireless communication channel loopback test circuit.

8. A redundant communication system comprising:

first and second transceivers, that are adapted to be coupled between a digital communication link and a wireless communication channel, one of said transceivers serving as a principal transceiver, and the other of said transceivers serving as a back-up transceiver that is adapted to be controllably placed in service in lieu of said principal transceiver; and a monitor protection switch containing a wireless communication channel loopback test circuit that is operative to test the functionality of that one of said first and second transceivers to which it is coupled, and a controllable switch that is operative to selectively couple said principal transceiver to said digital communication link and said wireless communication channel, while also coupling said back-up transceiver to said wireless communication channel loopback test circuit; and wherein said wireless communication channel loopback test circuit comprises a frequency generator that is operative to generate an auxiliary frequency signal having a frequency on the order of the sum or difference between a transmit frequency and a receive frequency employed by said principal and back-up transceivers, and a frequency combiner, coupled to said frequency generator and to said controllable switch, and being operative to combine said auxiliary frequency signal with an output frequency produced by that one of said first and second transceivers to which said wireless communication channel test circuit is switchably coupled.

9. The redundant communication system according to claim 8, wherein said frequency combiner includes a Schottky diode mixer and an attenuator network coupled between said frequency generator and said controllable switch.

10. A redundant communication system comprising:

first and second radio transceivers, one of said radio transceivers serving as a principal transceiver, and the other of said radio transceivers serving as a back-up transceiver that is adapted to be controllably placed in service in lieu of said principal transceiver, each radio transceiver being adapted to transmit over a radio communication channel on a first communication frequency and to receive over said radio communication channel at a second communication frequency, and including a diplexer having an interface port that is adapted to interface radio communication energy with a radio communication channel, a first transceiver-coupling port adapted to be coupled with a radio transmit port of said each transceiver, and a second transceiver port adapted to be coupled with a receive port of said each transceiver, said diplexer further including a transmission filter which is operative to pass signals having said first communication frequency and being coupled between said interface port and said first transceiver-coupling port, and a receive filter which is operative to pass signals having said second communication frequency, and being coupled between said interface port and said second transceiver-coupling port;

an RF loopback test circuit that is operative to test the functionality of that one of said first and second transceivers to which it is coupled, and including a frequency generator that is operative to generate an auxiliary frequency signal having a frequency on the order of the sum or difference between said first and second communication frequencies, and a frequency combiner, coupled to said frequency generator and to an input/output terminal, and being operative to combine said auxiliary frequency signal with an external signal coupled to said input/output terminal and to produce at said input/output terminal an output frequency corresponding to the sum or difference between said auxiliary frequency and the frequency of said external signal, said input/output terminal being adapted to be coupled to said interface port of said diplexer, so that the output of said receiver section may be monitored for the presence of said second communication frequency; and a controllable switch that is operative to selectively couple one of said principal transceiver and said back-up transceiver to said digital communication channel and to said radio communication channel, while also coupling the other of said principal transceiver and said back-up transceiver to input/output terminal of said RF loopback test circuit.

11. The redundant communication system according to claim 10, wherein said frequency combiner includes a Schottky diode mixer and an attenuator network coupled between said frequency generator and said input/output terminal.

* * * * *